(12) United States Patent
Gantt

(10) Patent No.: US 6,857,391 B1
(45) Date of Patent: Feb. 22, 2005

(54) ANIMAL TOILET ENCLOSURE

(76) Inventor: Clarence Leroy Gantt, 850 Country Dr., Barrington, IL (US) 60010-4131

( * ) Notice: Subject to any disclaimer, the term of this patent is extended or adjusted under 35 U.S.C. 154(b) by 0 days.

(21) Appl. No.: 10/614,530

(22) Filed: Jul. 7, 2003

Related U.S. Application Data
(60) Provisional application No. 60/394,047, filed on Jul. 6, 2002.

(51) Int. Cl.[7] .............................................. A01K 29/00
(52) U.S. Cl. ...................................................... 119/163
(58) Field of Search .............................. 4/662; 119/163, 119/161, 165, 168, 162

(56) References Cited

U.S. PATENT DOCUMENTS

| | | | | |
|---|---|---|---|---|
| 3,227,138 A | * | 1/1966 | Campbell | 119/163 |
| 3,734,057 A | * | 5/1973 | Lee et al. | 119/163 |
| 3,747,563 A | * | 7/1973 | Brockhouse | 119/163 |
| 3,835,812 A | * | 9/1974 | Edwards | 119/163 |
| 3,842,803 A | * | 10/1974 | Temel | 119/163 |
| 4,117,555 A | * | 10/1978 | Dennis | 119/163 |
| 4,196,693 A | * | 4/1980 | Unversaw | 119/164 |
| 4,271,544 A | * | 6/1981 | Hammond | 4/661 |
| 4,660,506 A | * | 4/1987 | Nalven | 119/163 |
| 4,729,342 A | * | 3/1988 | Loctin | 119/163 |
| 5,458,090 A | * | 10/1995 | Favreau | 119/163 |
| 5,564,364 A | * | 10/1996 | Kovacs et al. | 119/163 |
| 5,662,066 A | * | 9/1997 | Reitz | 119/163 |
| 6,176,201 B1 | * | 1/2001 | Fields | 119/165 |
| 6,453,844 B1 | * | 9/2002 | Janzen et al. | 119/163 |
| 6,457,435 B1 | * | 10/2002 | Bridges | 119/163 |
| 6,561,131 B1 | * | 5/2003 | Schwartz | 119/166 |

* cited by examiner

*Primary Examiner*—Yvonne R. Abbott
(74) *Attorney, Agent, or Firm*—Kirk A. Wilson

(57) ABSTRACT

The animal toilet enclosure has a bottom section removably coupled to a floorboard section, a cover section removably coupled to the floorboard section, and a controller for the enclosure. The bottom section has a bowl with an outlet in fluid communication with a grinding device and a sewer. The floorboard section has multiple floorboards each coupled with a, floorboard axle having either an active or passive rotating mechanism. The cover section has a sliding door, a hinged top, multiple vertical walls, and at least one shower head in fluid communication with a water supply. The enclosure is controlled by sensors and a pre-programmed activation circuit.

15 Claims, 6 Drawing Sheets

ANIMAL TOILET ENCLOSURE

CROSS-REFERENCE TO RELATED APPLICATIONS

This application claims the benefit of provisional patent application 60/394,047 filed on Jul. 6, 2002, the entirety of which is herein incorporated by reference.

TECHNICAL FIELD

This invention relates generally to animal toilets and more specifically to an automated animal waste toilet enclosure.

DESCRIPTION OF THE BACKGROUND ART

In my review of the previous art in the field, the following patents were consulted:

| Pat. No. | Inventor | Date |
| --- | --- | --- |
| 3,817,213 | Chalmars | June 18, 1974 |
| 3,949,429 | Hall | Apr. 13, 1976 |
| 3,964,437 | Brown | June 22, 1976 |
| 4,010,970 | Campbell | May 8, 1977 |
| 4,050,415 | Knochel et al | Sep. 27, 1977 |
| 4,117,555 | Dennis | Oct. 3, 1978 |
| 4,185,861 | Berner | May 29, 1980 |
| 4,196,693 | Uversaw | Apr. 8, 1980 |
| 4,228,554 | Tumminaro | Oct. 21, 1980 |
| 4,660,506 | Nalven | Apr. 28, 1987 |
| 6,014,946 | Rymer | Jan. 18, 2000 |
| 6,039,370 | Dooley, Jr. et al | Mar. 31, 2000 |
| 6,457,435 | Bridges | Oct. 1, 2002 |
| 6,554,335 | Kelly, et al | Apr. 29, 2003 |
| 6,561,131 | Schwartz | May 13, 2003 |
| 6,568,348 | Bedard | May 27, 2003 |

After a careful review of the listed patents it appears possible to group them under a few headings relative to their design and the difficulties and problems that might arise if they were in wide usage by the public.

The first grouping could be: Use of the Same Device By Both Animals and Humans. This is exemplified by the patents of Hall, 1976 and Rymer, 2000. These patents use a modified toilet seat that expands and contracts enough to manually arrange it as a seat for use by both humans and animals. Many humans would shy away from such use and it is very difficult to train an animal to void excreta while sitting or standing on a toilet stool seat.

The second grouping could be: Use of a Funnel Shaped Floor or Platform. This is presented in patents by Brown, 1976 and by Tumminaro, 1980. The sloping floor, while stable, creates a training problem for use by any animal and in the case of Brown required that a human push a button to initiate cleaning action.

The third grouping could be: Unstable Floor or Platform in order to initiate some mechanical action by downward movement of the floor. This is presented in patents by Knochel et al, 1977, Dennis, 1978, Unversaw, 1980, and Nalvern, weight down on a surface and it begins to move downward which would make training animals for this type of animal toilet very difficult.

The fourth grouping could be: The Use of Drain Holes for Removal of Excreta in a Flat Stable Board. This is exemplified by the patent of Bridges, 2002. Although it has the use of electronics to assist in the activation of cleaning of the flat stable board, there is no good mechanism for the cleaning of the underside of the board. It is removable to assist in this. The board also contains permanent open holes to allow the excreta to pass through. These holes are open while the animal is in the unit and constitute a hazard for harm to the legs of the animal.

The fifth group is probably not strictly an animal toilet so that it could be called: Catch Pouch on a Pole or a Pooper Bag. Both Dooley, 2000, and Kelly, 2003, present this concept very well in their patents. However, this system is not automatic and requires a great deal of human intervention.

The sixth group could be entitled: The Complex Litter Box. This concept is presented well in the patents of Schwartz, 2003, and Bedard, 2003. However, the use is limited to cats and involves special clumpable litter wherein the urine is removed as clumps of congealed litter along with fecal material by mechanical means such as rakes.

Although several patents have been issued for animal toilet inventions over many years, none have successfully solved the problem by presenting an acceptable method to the general public for rapid, simple economical disposal of dog and cat excreta. There has been no change in the handling of dog and cat excreta as compared to that of human excreta which has progressed from outdoor toilets to modern indoor toilets in bathrooms of first world people. A parallel development has been the invention of modern day washers and dryers for clothes and for dishes.

BRIEF SUMMARY OF THE INVENTION

To solve this major problem, I have invented an animal toilet that takes into account the natural instincts of dogs and cats, is electronically controlled and totally automated which closes, flushes, cleans semi-sterilizes and dries itself while preventing entry of an animal before it is ready for use again.

The animal toilet enclosure has a bottom section removably coupled to a floorboard section, a cover section removably coupled to the floorboard section, and a means for controlling the enclosure. The bottom section has a bowl with an outlet in fluid communication with a grinding device and a sewer. The floorboard section has multiple floorboards each coupled with a floorboard axle having either and active or means for rotating. The cover section has a sliding door, a hinged top, multiple vertical walls, and at least one shower head in fluid communication with a water supply. The means for controlling the enclosure has sensors and a pre-programmed activation circuit.

The enclosure which is presented in two basic models with two separate modes of rotation and stabilization of its floorboards, looks grossly from the outside like a large appliance such as an automatic floor-model dishwasher or like a human shower stall if it has been built into the substance of a building. A simplified training model, which is manual in its operation, is also presented.

The invention in its simplest concept is a free standing rectangular enclosure with a large free space inside, a top, four supporting vertical walls, a horizontally mobile entry/exit door, and a firm, stable, complete flat floor in the horizontal plane composed of independent boards that can be rotated either actively or passively automatically for cleaning and stabilized automatically afterward.

This allows an animal a space large enough to walk about before and after voiding excreta. There is no having to climb up onto a small area and sitting or standing there while voiding excreta. This floor is about level with the floor in the building. The firm stable floor creates no insecurity in any animal that uses the toilet enclosure. It has been noticed in the past that many dogs like the security of a cage. The resemblance of the toilet enclosure to a cage is expected to aid in the training of animals to use the animal toilet.

The presence of the animal is detected by electronic sensors as it enters the enclosure and turns on a soft overhead light. As the animal leaves the enclosure, this is detected by the electronic sensors connected to a pre-programmed electric activation component which activates an electric motor to close the entry/exit door. If the active mode of rotating and stabilizing the floorboards is used, the electronic circuitry activates an electromagnetic solenoid to retract its bar from an opening in one of several solid meshing gears connected directly to the floorboards. The electric activation component starts a spur electric motor connected by meshing gears to rotate or oscillate the floorboards as large volumes of water pour down from overhead and wall mounted shower heads. These volumes of water can be supplemented by water from a classical water closet if this is desired and the unit is built into the substance of a building.

If the passive mode of rotating and stabilizing of the floorboards is used, pins, entirely different from the bars of the solenoids, are used to stabilize the floorboards. Each one of these different pins passes through one vertical supporting wall and then into the end of a floorboard running parallel to the axles of the floorboards. These pins are moved outward by a third electric motor connected to the electric activation system of the enclosure, allowing the floorboards to rotate freely.

The excreta is washed down into a flattened bowl underneath the rotating or oscillating the floorboards. This bowl connects at its lowest point to a sewer outlet with the classic configuration for siphon flush action or to a small garbage disposal unit or similar grinder mechanism in-line to a sewer connection. Preset variable electronic controls operate the switching of the entire operation including the volume of water used after the animal leaves.

Closing of the entry/exit door and cleaning action starts only after the sensors indicate that the animal has left the unit. The washing and flushing of the bowl is augmented by streams of water from the underside of the rim of the bowl if the unit is built into the substance of the building.

In the active rotating and stabilizing mode, after the floorboards are cleaned ultra violet and heat lamps located overhead semi-sterilize and dry the boards after they return to their flat position which is maintained stable by the bar of at least one solenoid under pressure of its self contained spring passing through at least one opening in the supporting housing of the gears and an opening in the body of one of the gears.

In the passive mode of operation, the overhead water is turned off and the floorboards return to their flat position either by: a) Unbalanced rotation created by the axle being slightly off center of the long axis of rotation of the board, resulting in the board resting on a fixed pin projecting from the side of the vertical support board slightly below the level of the board's axle. The rotation of the boards operating in this mode is limited to an oscillation of about 90 degrees; b) Balanced free rotation of the floorboards through 360 degrees, which align themselves in a flat position when the pressure of the water stops turning them. This is accomplished by having stable magnetic strips on the edges of the boards; or c) If the momentum of the rotating floorboards is too great to allow easy alignment in the flat position for stabilization, additional attraction of the edges of the boards is created by the addition of more permanent magnets into the substance of the edges and ends of the floorboards. The magnets in the ends of the floorboards will face similarly aligned permanent magnets in the substance of the vertical supporting boards.

After the floorboards are returned to their flat position the different pins are reinserted into the openings for different pins by activation of the motor that produced the withdrawal of the different pins. These different pins all respond as a group because they are all firmly attached to a board that is moved forward and backward by the motor.

After the floorboards are stabilized, semi-sterilized and dry by overhead ultraviolet and heat lamps, the entry/exit door is opened by the electric circuitry and motor that closed it as the animal left the toilet.

The enclosure, which is now clean and dry with an open door, is ready again for use as an animal toilet.

There is one additional feature only present in the exclusive cat toilet that is not present in other modes. This is the depositing of a controlled amount of water-soluble cat litter on the dry surface of the floorboards from an overhead storage bin prior to the opening of the entry/exit door. This feature is controlled by the electronic-electric control system.

The enclosure can also be built as a freestanding unit in a very small building such as in a park. It must have the proper water and sewer connections regardless of its location.

The size of the enclosure can be extremely variable dependent on the size and weight of the animals that will use it. A feline unit can be built or placed on top of a canine unit.

A very inexpensive training animal toilet has been invented for use by animal breeders and trainers. This animal unit lacks the automatic electronic features. Operation is manual except when a garbage disposal is used in-line to the sewer. It must be connected to a sewer system and washed with a hand held water hose.

All of the electronic equipment, motors, water valves and other plumbing used in the invention are of common commercial types. The various parts of the enclosure may be made of metal, wood, plastic, ceramic or vitreous or similar common materials.

The most unique components of the invention in relation to canine and feline toilets are: a) The floorboards produce a flat firm floor on which an animal can walk about before and after voiding excreta. The floorboards are then rotated by either a passive or active mechanism and washed on all areas by overhead streams of water after an entry/exit door is closed preventing an animal from entering the toilet while it is cleaning itself. The washing water carries the excreta into a flush-type bowl beneath the floor which, in turn, is connected to: b) A garbage disposal or similar type grinding apparatus in line to an ordinary sewer system with a common one-way water valve in the line after the garage disposal.

Except for the most unique components, the invention resides in the total combination of all its parts put together in a unique manner to allow the making and claiming of a new practical animal toilet invention that can readily solve the age old problem of the rapid disposition of canine and feline voided excreta.

DETAILED DESCRIPTION OF THE INVENTION

Figure 1:
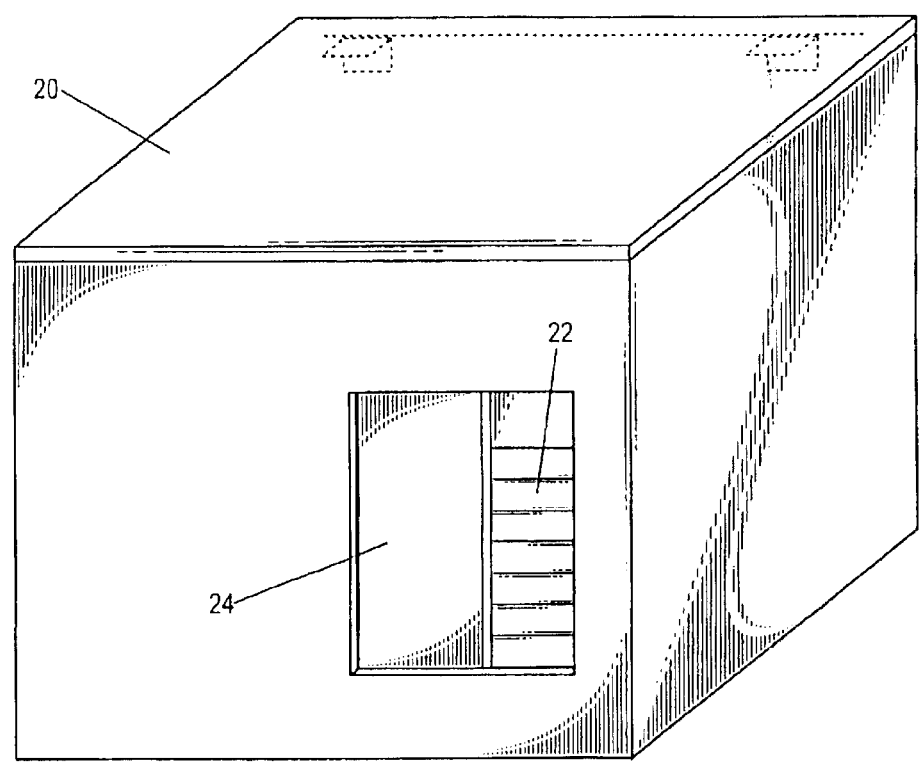
FIG. 1. Outside View of Animal Toilet in Preferred Mode

Structural elements of the invention are labeled as follows:

| | |
|---|---|
| 20 - Hinged Top | 82 - Motor Stabilizing Strap |
| 22 - Floorboards | 84 - Reversible Electric Motor with Axle at Both Ends |
| 24 - Sliding Door | |
| 26 - Rear-Emptying Bottom Bowl | |
| 28 - End Wall of Bottom | 86 - sloping groove for solenoid pin |
| 30 - Side Wall of Bottom | |
| 32 - Sewer Conduit | 88 - opening for solenoid pin |
| 34 - Garbage Disposal | |
| 36 - Outlet to Sewer Line | 90 - solenoid |
| 38 - Motor of Garbage Disposal | 92 - solenoid support |
| | 94 - spur electric motor |
| 40 - One-Way Valve In-Line to Sewer | 96 - axle of small electric motor axle |
| 42 - Electric Wire With Plug | 98 - small spur gear on small electric motor axle |
| 44 - Set Screw | |
| 46 - Side Floorboard Wall | 100 spur gear fixed to floorboard axle |
| 47 - Center-Emptying Bowl | |
| 48 - Floorboard Axle | 102 - modified floorboard axle with female coupling on outer end |
| 50 - Upper Underneath Pin | |
| 52 - Lower Underneath Pin | |
| 54 - Space Between Floorboards | 104 - modified floorboard axle with mate coupling on inner end |
| 56 - Connecting End Board | |
| 58 - Set Screw | 106 - sleeve of plastic or brass |
| 60 - Floorboard Pin | |
| 62 - Pinboard Stabilizing Pin | 108 - worm gear of vertically placed motor not shown |
| 64 - Blank | |
| 66 - Blank | |
| 68 - Moveable Pinboard | 110 - solenoid pin |
| 70 - Plastic of Metal Sleeve | 112 - solenoid spring |
| 72 - File Gear Support with Screws | 114-solenoid electromagnet |
| | 116 - long supporting and spacing screw |
| 74 - File Gear | |
| 76 - Round Spur Gear | 118 - nut on end of long supporting and spacing screw |
| 78 - Axle of Motor | |
| 80 - Electric Wire with Male plug | |
| | 120 - spur gear |
| | 122 - spacing sleeve over long supporting and spacing screw |

The invention is a freestanding enclosure with a rectangular shape. It has a large free space inside, a top 20, four supporting vertical walls, a horizontally mobile entry/exit door 24, and a firm stable floor of independent floorboards 22, with an open space 54 of about one quarter of an inch between the floorboards in the horizontal plane, with rotational horizontal axles at each end of the floorboards that are supported by openings in the lower portion of two oppositely placed the vertical walls.

The invention is presented in two separate modes either: 1) a pre-built mode that looks like a floor model electric dishwasher with a front see-through window or 2) the mode in which the various separate parts of the animal toilet are built into the substance of a building. Each of the two modes have the option of using either an active or passive method for rotation of the floorboards. A simplified manually operated training mode based on the plan of the basic automatic mode is also presented.

All of the animal toilets with the exception of the manual training mode have overhead infrared motion sensors connected to an electric circuit that automatically controls all the events in the enclosure unless interrupted by a manual switch controlled by a human. The toilet also has several other safety devices, which are listed separately.

The enclosure has three sections that fit snuggly on top of each other in the vertical plane. They are the Bottom, the Floorboards With Supporting and Attached Devises and the Cover. They are best described separately.

Figure 2:
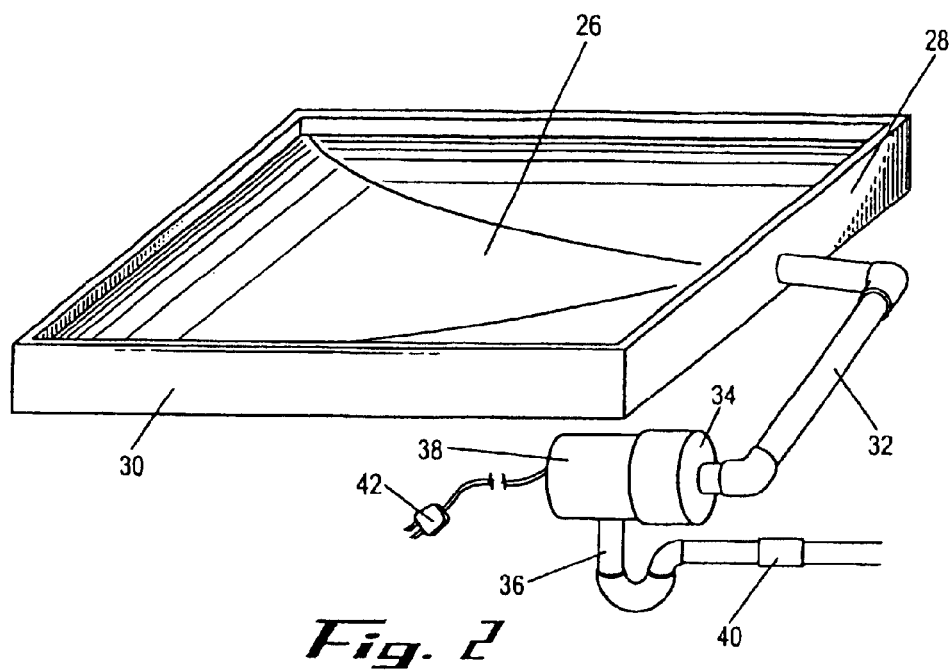
FIG. 2. Top Right View of Rear-Emptying Bottom Bowl
Figure 3:
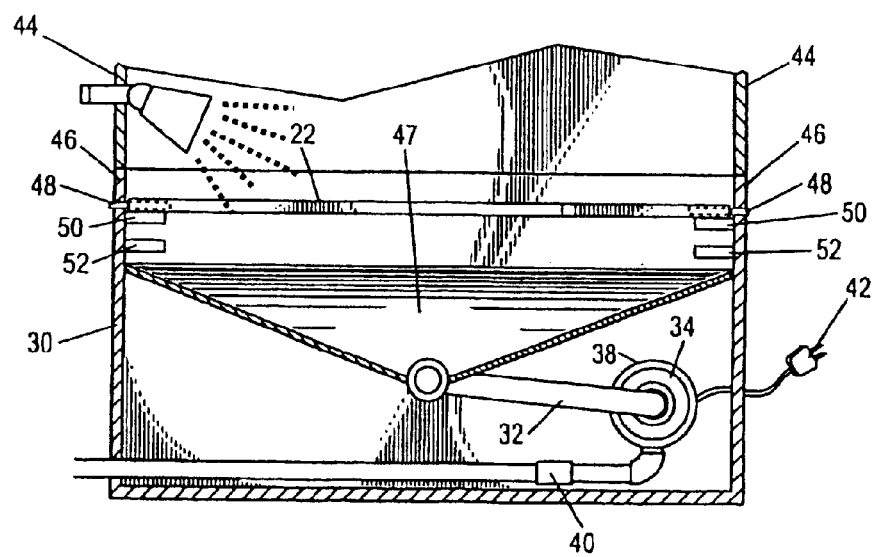
FIG. 3. Cross Section of Bottom With Center-Emptying Bowl

The Bottom, as seen in FIGS. 2 and 3, is the lowest section. It has two supporting sides 30, and two supporting ends 28, a bowl with either a rear outlet 26, or a central area outlet 47 into which excreta is washed and collected. The outlet is at the lowest point of the bowl and connects to a conduit water trap 32 in the centrally placed outlet only. The conduit 32, connects to a small in line garbage disposal 34, or similar grinding device with an electric motor 38. The outlet of the garbage disposal 36, has an in line one-way water valve 40, just beyond the outlet. An electric wire with a male plug must be connected to the central electronic-electric control system for operation. FIG. 3 illustrates how the three sections sit on top of each other. The bottom walls 30, fit snuggly under the floorboard walls 46, while the cover wall 44, sits on top of the floorboard walls.

Figure 6:
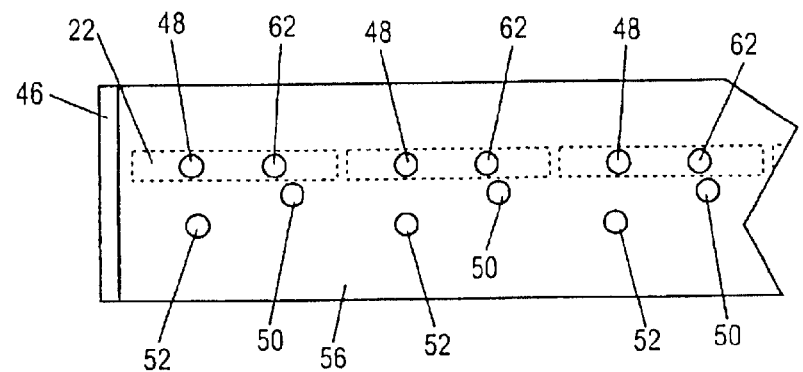
Figure 7:
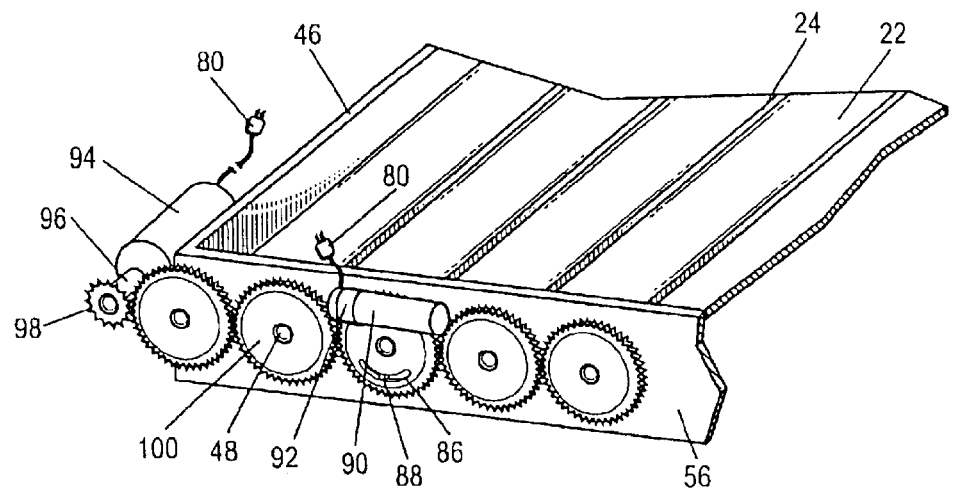
FIG. 7. Partial side view of spur gears with horizontal side motor in active full rotational mode.

The Floorboards With Supporting and Attached Devices is quite unique in the field of animal toilets and the most difficult to describe. The floorboards 22, shown in FIG. 4 with a small space 54 of approximately one-quarter of an inch between them. The floorboards are in the horizontal plane and are supported by a horizontal axle 48 at each end. The axle traverses an opening in an adjacent supporting end wall 56. The openings for the axles 58 in the supporting connecting end board 56, are shown in FIG. 6. There is a sleeve of plastic or metal in the connecting wall openings 58, to allow easy rotation of the axles within the opening in the wall.

The mechanism chosen for the rotation of the floorboards determines the attached devices, which will be used to accomplish rotation.

Figure 8:
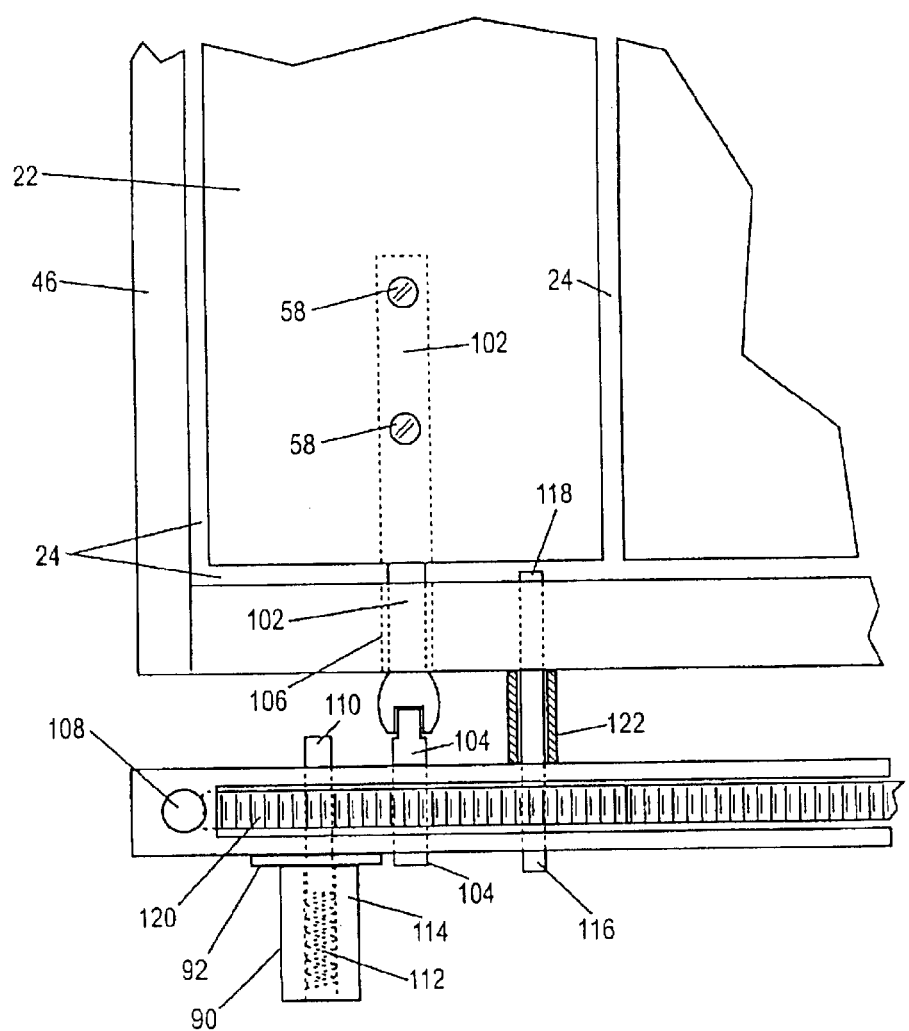
FIG. 8. Partial top view of spur gears held in gear group casing

In the active method of rotation of the floorboards, a series of round spur gears are supported by a gear group casing as shown in FIG. 8. The floorboards are kept level and secure by the bar or pin 110, of a solenoid 90, attached to the supporting structures of the gears. This pin 110, is pushed forward by a rather strong spring 112, inside of the solenoid. The pin or bar traverses the supporting structures of the gears and passes through an opening in the solid wheel portion of one of the gears. There is a slanting groove 86 on each side of the opening 88, in the solid spur gear for ease of placing the solenoid bar into the opening.

As an animal enters the enclosure, the animal's presence is immediately detected by the sensors, which activate an electric circuit to turn on a soft light. When the animal leaves the enclosure the sensors detect this and activate a circuit to close the entry/exit door 24, and start a series of timed events that are dependent on whether the active or passive method of floorboard rotation is chosen.

When the active method of rotating the floorboards is used, the electric circuitry activates an electromagnetic solenoid 90, the bar or pin 110, of which holds the floorboards firmly in place by passing through the supporting structure 92 of the solenoid and through an opening in the solid wheel portion of one of the gears 86, and 8B by a strong spring 112, within the solenoid when the solenoid is not activated. Upon activation of the solenoid's electromagnet 114, the solenoid actively pulls the pin or bar out of the opening of the solid wheel spur gear 120. This action allows the gear to turn in response to a spur electric motor 94, the axle 96, of which has a small spur gear 98, firmly attached to the axle. The axle 96, of the motor 94, is placed in the horizontal plane parallel to the axles of the floorboards so that the small spur gear 98, meshes properly with the solid spur gears.

The motor that turns the spur gears can be placed in different locations around the spur gears as demonstrated in FIG. 8 where the upper end of a worm gear 108 of the motor, which is not shown, connects with a compatible configuration of the spur gears 100. This group of spur gears 100, is supported by a housing referred to as gear group casing, FIG. 8.

The axles 104 of the solid spur gears are securely connected to the gears at one end. They are modified before entering the connecting end board. The axle is separated into a male 104, and a female 102, coupling parts for easy separation of the gears and their housing from the connecting end board 56, by removal of long supporting and spacing screws 116, and nuts 118. The length of spacing sleeves 122, over the long supporting and spacing screw 116, controls the meshing of the male and female coupling. The female part of the axle 104, passes through a plastic or metal sleeve 106, in the connecting end board 56, and is held securely in the end of the floorboards 22, by setscrews 58.

When the passive mode of rotation is used, the Floorboards With Supporting and Attached Devices section is different from that used with the active mode of rotation. This is the only section of the invention that changes with the different modes of rotation, except for slight changes in the wiring from the electric controls to the various motors.

Figure 4:
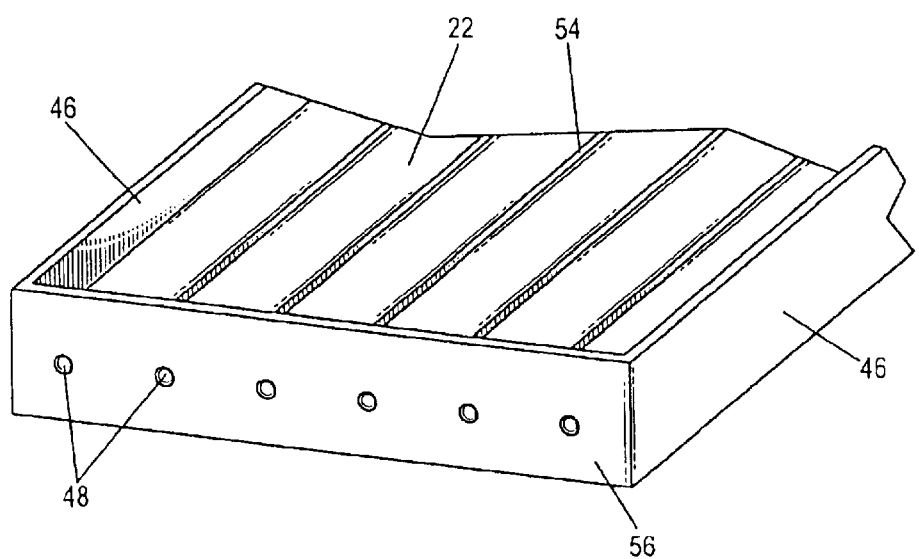
FIG. 4. Floorboards With Supporting Sides and Ends

The floorboards 22, shown in FIG. 4, are in the horizontal plane and are supported by an axle 48, at each end that traverses an opening in the adjacent supporting end wall 56. The openings for the axles 48, in the supporting connecting end board 56, are shown in FIG. 6. There is a collar or sleeve of plastic or metal in the connecting wall opening to allow easy rotation of the axles within the wall 56. In the mode of the limited rotation of the floorboards there are two short pins, called underneath pin upper 50 and underneath pin lower 52 that are anchored within the connecting end board. The pins project toward the inside of the enclosure and limit the rotation of the floorboards. The upper pin 50 is located in a plane slightly below and parallel to the axle 58, so as to prevent the floorboard from rotating past its level position on the side that the pin is located. The underneath pin lower 52, is located farther down on the board in the same vertical plane as the axle so as to limit rotation of the floorboard in the opposite direction resulting in the board being erect on its edge much of the time during the washing by water from overhead shower heads. The actual oscillation range of the floorboard in this operating mode is approximately 80 degrees.

Figure 5:
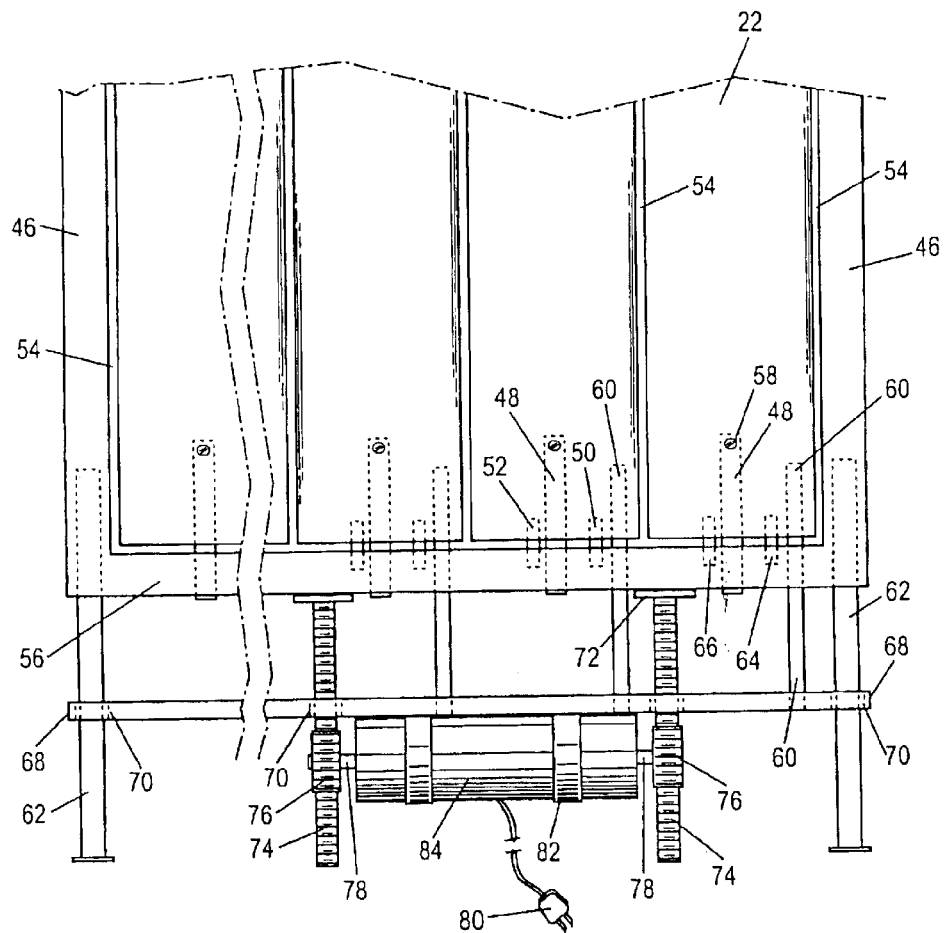
FIG. 5. Top View of Floorboards with File Gears and Motor for Passive Oscillation of Floorboards Mode FIG. 6. Sectional End View of openings through connecting end board for three floorboards.

The floorboards 22, are held in a flat stabilized position in this mode by floorboard pins 60, in addition to the pins or axles used elsewhere in the invention as shown best in FIG. 5. The floorboard pins 60, traverse the supporting end wall 56, with one end of each pin pointing toward the center of the enclosure entering into an opening at one end of the floorboard and running parallel to the axis of the board's axle 48, to secure the floorboard firmly in the horizontal plane. A slight depression, which is not shown, is present around the entrance of the opening into the floorboard for the pin to help guide the pin into the opening in the end of the floorboard. Each floorboard is held firmly by at least one floorboard pin 60. Two or more pins may be used for each floorboard if the enclosure is very large and the floorboards are very heavy floorboard pins 60, are all securely mounted on a board, the pinboard, 68. The pinboard is located outside of the connecting wallboard 56, and is exactly parallel to the connecting wallboard. The pinboard is supported by four pinboard stabilizing pins 62, which are firmly embedded in the sidewalls 46, of the enclosure. The pinboard slides along the stabilizing pins 62, with the assistance of smooth plastic or metal sleeves in the openings for the pins in the pinboard 70. The stabilizing pins 62, have a metal head or cap to prevent the pinboard from sliding off the end of the stabilizing pins. There are two long thin pieces of metal or hard plastic that are firmly attached by screws 72, to the outside surface of the connecting wall 68. The long pieces glide through openings in the pinboard assisted by smooth sleeves of plastic or metal 70. The long pieces have spurs on their upper surface and function as a file gear 74 when meshed with round spur gears 76, on the axle 78, of a reversible electric motor 84, secured to the pinboard by encircling straps 82. As the motor turns, the pinboard pushes the different pins into the ends of the floorboards to stabilize the floorboards or when the motor is reversed and moving in the opposite direction to remove the pins from the ends of the floorboards, but not from the connecting end wall 65 to allow free oscillation of the floorboards between upper underneath pin 50, and lower underneath pin 52, in response to the varied directional pressure of streams of water coming down from carefully pre-directed overhead shower heads.

The freely oscillating floorboards cannot be securely stabilized by the pins connected to the pinboard until the floorboards have come to rest in a flat position in the horizontal plane after the overhead water is turned off. To accomplish this, one or combinations of three techniques are used: 1) The first has the floorboards axles placed slightly off center away from the upper underneath pin to make that side of the board slightly longer and therefore slightly heavier than the opposite side. Since the floorboards only rotate through 80 degrees, the heavier side never quite reaches the vertical position so always has a tendency to fall down toward the upper underneath pin; 2) The second uses a strip of permanent magnetic tape on the edges of each floorboard to increase the tendency of the boards to line up parallel to each other; 3) The third uses permanent magnets imbedded in the edges of the floorboards. This technique can be extended to the ends of the floorboards, if permanent magnets are placed in corresponding horizontal rows in the floorboard supporting ends.

The Cover is composed of four walls, one of which has a small entry/exit door, and a top with two separate levels. The upper level is the very top of the enclosure shown in FIG. 1, number 30. It has hinges near the rear so that it may be lifted to get to the next level lower, which is not shown. The lower level is located a few inches below the upper level making a compartment between the two levels. The compartment contains all of the electrical connections for the sensors and lamps, the electrical control center, several off-on switches and the electrically controlled water valves connected to the building water supply and the shower heads which are mounted on the lower level of the cover. There are several small openings present in the lower level to allow any water leaks to drain into the open chamber below in order to keep all electric equipment absolutely dry. The opening of the upper level allows convenient access to the controlling parts of the toilet. The walls of the cover are essentially straight in the vertical plane and form a cover for the other sections of the toilet. They usually extend to the floor level so as to cover all exposed mechanical parts of the toilet. They are separate sheets of metal or plastic anchored with screws to each other to make a water tight seal yet allow easy access to the parts covered by them. The entry/exit door is located in the front wall. The door moves from side to side by means of an electric motor mounted on the outside wall with its axle passing through the wall. A round spur gear with very small spurs is mounted on the axle. The spur gear meshes with compatible spurs which appear as notches on the under edge of the sliding door. This allows the sliding door to be opened and closed by the round spur gear and yet allows any slight object that the door might encounter to hold the door in place while the gears spin on each other because of the small spurs and the fact that the sliding door is very light and easily displaced upward if the door encounters significant resistance while moving.

PREFERRED EMBODIMENT OF THE INVENTION

The preferred embodiment contemplated for the invention is one that looks like any large appliance such as a floor model electric dishwasher. It uses the passive mode of oscillation for the floorboards through about an 80-degree range while washing its floorboards. The bowl beneath is connected to a garbage disposal with a one-way valve in line to the sewer. The enclosure is connected to a 110 volt alternating current outlet, to a cold water connection in a building, and to an air exhaust system of a building or smaller structure. It has the standard electronic-electric sensor and activation mechanisms in place.

The size of the enclosure and its parts will depend on the space available and the size of the animals that will use it as a toilet facility. There are no specific limitations on the size of the animal toilet, as it can be built to any practical size.

The enclosure has a rectangular shape with a large free space inside, a top 20, four vertical supporting walls, a horizontally mobile entry/exit door 24, and a firm stable floor of independent floorboards 22, with an open space of about one quarter of an inch between the floorboards in the horizontal plane 54. There are rotational axles 48, in the horizontal plane at each end of the floorboards supported by openings in two oppositely placed vertical end walls, one of which is designated for easy reference as connecting end board 56.

The enclosure has three sections that fit snuggly on top of each other; the Bottom, the Floorboards, and the Cover. They are best described separately. The Bottom is the lowest section. It has two supporting sides 30, and two supporting ends 28, a bowl with either a rear outlet 26 or a central outlet 47, into which excreta is washed and collected. The outlet is at the lowest point of the bowl and connects to a conduit water trap 32 at its lowest level in the center outlet model only. Either way, the conduit 32, connects to a small in-line garbage disposal unit 34, or similar grinding device with an electric motor 38. The outlet of the garbage disposal to the sewer 36, has an in-line one way water valve 40, just beyond the outlet. An electric wire with a male plug 42, must be connected to the central electronic/electric control system for operation. FIG. 3 illustrates how the three sections sit on top of each other. The bottom walls 30, fit snugly under the floorboard walls 46, while the cover wall 44, sits on top of the floorboard walls. This figure also shows the floorboard axles 48, and a floorboard 22, turned on edge. The floorboard rotation controlling pins 50, and 52, which are underneath the board 22, are also shown.

The Floorboards with their supporting and operating parts are extremely important components of the invention. The floorboards 22, shown in FIG. 4, are in the horizontal plane and are supported by an axle 48, at each end that traverses an opening in the adjacent supporting end wall 56. The openings for the axles 58, in the supporting connecting end board 56, are shown in FIG. 6. There is a collar or sleeve of plastic or metal in the connecting wall opening to allow easy rotation of the axles within the wall 56. In the mode of limited rotation of the floorboards, there are two short pins, called underneath pin upper 50, and underneath pin lower 52, that are anchored within the connecting end board. The pins project toward the inside of the enclosure and limit the rotation of the floorboards. The upper pin 50, is located in a plane slightly below and parallel to the axle 58, so as to prevent the floorboard from rotating past its level position on the side that the pin is located. The underneath pin lower 52, is located farther down on the board in the same vertical plane as the axle so as to limit rotation of the floorboard in the opposite direction, resulting in the board being erect on its edge much of the time during the washing by water from overhead shower heads. The actual oscillation range of the floorboard in this operating mode is approximately 80 degrees. The floorboards 22, are held in a flat stabilized position in this mode by floorboard pins 60, than the pins or axles used elsewhere in the invention as shown best in FIG. 5. The floorboard pins 60, traverse the supporting end wall 56, with one end of each pin pointing toward the center of the enclosure entering into an opening at one end of the floorboard and running parallel to the axis of the board's axle 48, to secure the floorboard firmly in the horizontal plane. A slight depression, which is not shown, is present around the entrance of the opening into the floorboard for the pin to help guide the pin into the opening in the end of the floorboard. Each floorboard is held firmly by at least one floorboard pin 60. Two or more pins may be used for each floorboard, if the enclosure is very large, and the floorboards are very heavy. The floorboard pins 60, are all securely mounted on a board, the pinboard, 68. The pinboard is located outside of the connecting wallboard 56, and is exactly parallel to the connecting wallboard. The pinboard is supported by four pinboard stabilizing pins 62, which are firmly embedded in the sidewalls 46, of the enclosure. The pinboard slides along the stabilizing pins 62, with the assistance of smooth plastic or metal sleeve in the openings for the pins in the pinboard 70. The stabilizing pins 62 have a metal head or cap to prevent the pinboard from sliding off the end of the stabilizing pins. There are two long thin pieces of metal or hard plastic that are firmly attached by screws 72, to the outside surface of the connecting wall 68. The long pieces glide through openings in the pinboard assisted by smooth sleeves of plastic or metal 70. The long pieces have spurs on their upper surface and function as a file gear 74, when meshed with round spur gears 76, on the axle 78, of a reversible electric motor 84, secured to the pinboard by encircling straps 82. As the motor turns, the pinboard pushes the different pins into the ends of the floorboards to stabilize the floorboards or when the motor is reversed and moving in the opposite direction to remove the pins from the ends of the floorboards but not from the connecting end wall 65, to allow free oscillation of the floorboards between upper underneath pin 50, and lower underneath pin 52 in response to the varied directional pressure of streams of water coming down from carefully pre-directed overhead shower heads.

The freely oscillating floorboards cannot be securely stabilized by the pins connected to the pinboard until the floorboards have come to rest in a flat position in the horizontal plane after the overhead water is turned off. To accomplish this, one or combinations of three techniques are used: 1) The first has the floorboards axles placed slightly off center away from the upper underneath pin to make that side of the board slightly longer and therefore slightly heavier than the opposite side. Since the floorboards only rotate through 80 degrees, the heavier side never quite reaches the vertical position so always has a tendency to fall down toward the upper underneath pin; 2) The second uses a strip of permanent magnetic tape on the edges of each floorboard to increase the tendency of the boards to line up parallel to each other; 3) The third uses permanent magnets imbedded in the edges of the floorboards. This technique can be extended to the ends of the floorboards, if permanent magnets are placed in corresponding horizontal rows in the floorboard-supporting end.

The Cover is composed of four walls, one of which has a small entry/exit door, and a top with two separate levels. The upper level is the very top of the enclosure shown in FIG. 1, number 20. It has hinges near the rear so that it may be lifted to get to the next level lower, which is not shown. The lower level is located a few inches below the upper level making a compartment between the two levels. The compartment contains all of the electrical connections for the sensors and lamps, the electrical control center, several off-on switches and the electrically controlled water valves connected to the building water supply and the shower heads which are mounted on the lower level of the cover. There are several small openings present in the lower level to allow any water leaks to drain into the open chamber below in order to keep all electric equipment absolutely dry. The opening of the upper level allows convenient access to the controlling parts of the toilet. The walls of the cover are essentially straight in the vertical plane and form a cover for the other sections of the toilet. They usually extend to the floor level so as to cover all exposed mechanical parts of the toilet. They are separate sheets of metal or plastic anchored with screws to each other to make a water tight seal yet allow easy access to the parts covered by them. The entry/exit door is located in the front wall. The door moves from side to side by means of an electric motor mounted on the outside wall with its axle passing through the wall. A round spur gear with very small spurs is mounted on the axle. The spur gear meshes with compatible spurs which appear as notches on the under edge of the sliding door. This allows the sliding door to be opened and closed by the round spur gear and yet also allows any slight object that the door might encounter to hold the door in place while the gears spin on each other because of the small spurs and the fact that the sliding door is very light and easily displaced upward if the door encounters significant resistance while moving.

While there has been shown and described what are at present considered the preferred embodiments of the invention, it will be obvious to those skilled in the art that various changes and modifications can be made therein without departing from the scope.

I claim:

1. An active animal toilet enclosure comprising a bottom section removably coupled to a floorboard section, a cover section removably coupled to said floorboard section, and a means for controlling said enclosure, wherein;
    said bottom section further comprises a bowl having an outlet in fluid communication with a grinding device and a sewer; and
    said floorboard section further comprises multiple floorboards each coupled with a floorboard axle having an active means for rotating; and
    said cover section further comprises a sliding door, a hinged top, multiple vertical walls, and at least one shower head in fluid communication with a water supply; and
    said means for controlling said enclosure further comprising sensors and a pre-programmed activation circuit.

2. The active animal toilet enclosure of claim 1 wherein said active means for rotating further comprises a spur gear attached to each said floorboard axle, said spur gears engaged with each other and one spur gear engaged with a spur electric motor in electric communication with said pre-programmed activation circuit.

3. The active animal toilet enclosure of claim 2 wherein said active means for rotating further comprises an electromagnetic solenoid in mechanical communication with at least one said spur gear and in electric communication with said pre-programmed activation circuit.

4. The active animal toilet enclosure of claim 1 wherein said bottom section further comprises a bowl rim washing means in fluid communication with said water supply and in electric communication with said pre-programmed activation circuit.

5. The active animal toilet enclosure of claim 1 wherein said cover section further comprises at least one device in electric communication with said pre-programmed activation circuit, said device selected from the group consisting of ultra violet lamp, heat lamp, and light bulb.

6. The active animal toilet enclosure of claim 1 wherein said cover section further comprises a litter storage bin in electric communication with said pre-programmed activation circuit.

7. The active animal toilet enclosure of claim 1 wherein said sensors comprise infrared motion sensors in electric communication with said pre-programmed activation circuit.

8. The active animal toilet enclosure of claim 1 wherein said enclosure is constructed from at least one of the materials selected from the group consisting of metal, wood, plastic, ceramic, and vitreous.

9. A passive animal toilet enclosure comprising a bottom section removably coupled to a floorboard section, a cover section removably coupled to said floorboard section, and a means for controlling said enclosure, wherein;
    said bottom section further comprises a bowl having an outlet in fluid communication with a grinding device and a sewer; and
    said floorboard section further comprises multiple floorboards each coupled with a floorboard axle having a passive means for rotating; and
    said cover section further comprises a sliding door, a hinged top, multiple vertical walls, and at least one shower head in fluid communication with a water supply; and
    said means for controlling said enclosure further comprises sensors and a pre-programmed activation circuit.

10. The passive animal toilet enclosure of claim 9 wherein said passive means for rotating further comprises:
    a movable pinboard in mechanical communication with a reversible electric motor, said reversible electric motor in electric communication with said pre-programmed activation circuit, said pinboard further comprising at least one floorboard pin removably engaged with each said floorboard, and at least one underneath pin upper removably positioned in the rotating path of each said floorboard, and at least one underneath pin lower removably positioned in the rotating path of each said floorboard, and wherein said at least one shower head emits water onto said floorboards having disengaged floorboard pins thereby initiating passive rotation of each floorboard in an oscillating motion between each upper and lower underneath pin.

11. The passive animal toilet enclosure of claim 9 wherein said bottom section further comprises a bowl rim washing means in fluid communication with said water supply and in electric communication with said pre-programmed activation circuit.

12. The active animal toilet enclosure of claim 9 wherein said cover section further comprises at least one device in electric communication with said pre-programmed activation circuit, said device selected from the group consisting of ultra violet lamp, heat lamp, and light bulb.

13. The passive animal toilet enclosure of claim 9 wherein said cover section further comprises a litter storage bin in electric communication with said pre-programmed activation circuit.

14. The passive animal toilet enclosure of claim 9 wherein said sensors comprise infrared motion sensors in electric communication with said pre-programmed activation circuit.

15. The passive animal toilet enclosure of claim 9 wherein said enclosure is constructed from at least one of the materials selected from the group consisting of metal, wood, plastic, ceramic, and vitreous.

* * * * *